United States Patent [19]

Sasaki

[11] Patent Number: 4,514,457

[45] Date of Patent: Apr. 30, 1985

[54] LOW-PROFILE TRANSFER ARTICLE

[75] Inventor: Makoto Sasaki, Mishimia, Japan

[73] Assignee: Minnesota Mining and Manufacturing Company, St. Paul, Minn.

[21] Appl. No.: 467,435

[22] Filed: Feb. 17, 1983

[30] Foreign Application Priority Data

Feb. 19, 1982 [JP] Japan .................................. 57-25688

[51] Int. Cl.[3] .......................... B32B 3/18; B41M 5/00

[52] U.S. Cl. ...................................... 428/204; 428/40; 428/172; 428/173; 428/206; 428/220; 428/323; 428/352; 428/354; 428/914

[58] Field of Search ............... 156/234, 235, 239, 240, 156/249, 277; 428/40, 201, 202, 204, 206-208, 220, 323, 324, 325, 327-331, 352, 354, 402-404, 913, 914, 172, 173, 203; 427/146

[56] References Cited

U.S. PATENT DOCUMENTS 4,075,049 2/1978 Wood .................................. 428/914

FOREIGN PATENT DOCUMENTS 492847 5/1953 Canada ................................ 428/914

*Primary Examiner*—Bruce H. Hess

*Attorney, Agent, or Firm*—Donald M. Sell; James A. Smith; James V. Lilly

[57] ABSTRACT

A low-profile transfer article having an adhesive layer, a coating of particles on one surface of the adhesive layer, and a graphic image formed of one or more layers of ink adherably bonded to the ink-receptive surface of the particles, the transfer article being free of a permanent self-supporting film support layer.

8 Claims, 2 Drawing Figures

LOW-PROFILE TRANSFER ARTICLE

TECHNICAL FIELD

This invention relates to a low-profile, flexible, dry transfer article or decalcomania, particularly a transfer article free of a self-supporting, integral backing film layer.

BACKGROUND ART

One form of dry transfer material includes an adhesive layer applied to one surface of a continuous, self-supporting base film and one or more ink layers distributed in a graphic pattern on the opposing face of the base film. The film provides a substrate for the ink and adhesive, and maintains the two permanently separated so as not to contaminate one with the other. Also, because of the relatively thick, self-supporting nature of the film, the transfer article is storable and handleable without substantially wrinkling, cracking, or the like. Along with the advantages conferred by the presence of the base film are certain disadvantages, principally cost of the film, and the substantial thickness its presence imparts to the transfer article. This latter feature creates both aesthetic and performance drawbacks. Aesthetically, the high profile of the transfer article relative to the surface of the substrate to which the article is affixed creates an artificial appearance. From a performance standpoint, the higher profile increases the likelihood that the transfer article will be lifted at the edges allowing foreign matter to invade the space between the substrate and the transfer article, causing further erosion of the adhesive bond. Reducing the base or support film thickness leads to a reduction in the advantages sought to be achieved by the film.

Another form of transfer article eliminates altogether the support or base film, providing a marking as thin as 10 to 40 microns. Such an article approximates painted markings in aesthetics. However, elimination of the base film imposes such substantial restrictions on both the manufacturing techniques required to construct such an article and the materials which can be utilized in the construction as to militate against adoption of this form for many uses, particularly where rigorous environmental conditions may be encountered. Among the manufacturing restrictions are the need to reverse print the graphic design (for two color printing, the second layer must be printed before the first ink layer) and the dependence upon selective techniques for applying the adhesive (silk screening or gravure printing rather than roll coating). In terms of material restrictions, a principle one is that the adhesive is generally a latent type, for example, a water-soluble or solvent activated adhesive. This in turn requires that an adhesive actuation step be introduced into the bonding procedure, adding additional time, difficulty, and skill demands to the use of this type of decal. Such supportfilm free graphics are also generally more brittle and less tough, restricting if not eliminating the type of cutting and trimming operations which are employed with conventional film-based graphics to provide the finished decal shape and remove waste.

It is therefor one object of this invention to provide a dry transfer article which is flexible, low-profile, and eliminates the self-supporting base film in its construction.

Another object is to provide a dry transfer article which allows use of adhesives applicable by conventional fast coating techniques and does not require activation at time of bonding.

Another object is a low profile, flexible transfer article printable by conventional printing methods with conventional inks in direct as opposed to reverse order.

DISCLOSURE OF THE INVENTION

These and other objects which will become apparent hereinafter are provided in the present invention by a low profile, flexible dry transfer article comprising a first layer comprising an adhesive capable of bonding the article to a given substrate, a second layer securably adhered to the first layer, the second layer comprising a coating of discrete, inert particles sufficiently proximately placed relative to one another to present an ink-printable surface, and a third layer adhered to the ink printable surface of the second layer, the third layer comprising at least one stratum of ink defining a predetermined pattern, the article being free of a permanent, self-supporting base film. Such a transfer article, which is of unitary construction, preferably embodies an adhesive which is pressure-sensitive at room temperature and further includes as part of the second layer a matrix substance, particularly a resin, which provides a lateral matrix for the inert particles whereby the second layer serves as a barrier to migration of the adhesive from the first layer through the second layer into contact with the third layer. The transfer article may further include a fourth layer overlying the third layer to serve as a protective layer for the graphic design defined by the aforesaid ink.

BRIEF DESCRIPTION OF THE DRAWINGS

The invention is illustrated by the accompanying drawings wherein.

DESCRIPTION OF THE INVENTION

Figure 1:
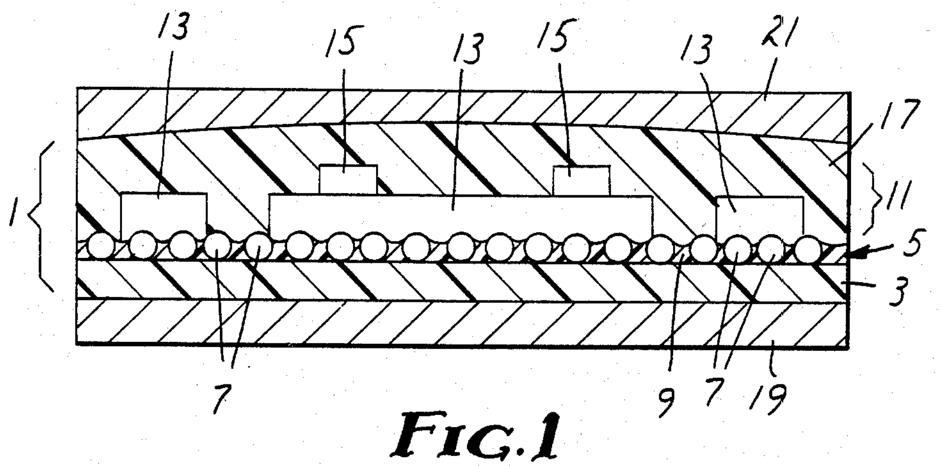
FIG. 1 is an enlarged cross-sectional view of an embodiment of the dry transfer article of the invention with associated temporary release liners.

Referring to FIG. 1, dry transfer article 1 includes an adhesive layer 3 overlying which is layer 5 composed of particles 7 disposed in a matrix of substance 9. Overlying the layer 5 is a graphic design layer 11 composed of a first ink 13 and a second ink 15. Covering layer 11 is a protective layer 17. Dry transfer article 1 is sandwiched between liner 19 and application tape 21, the former being a conventional release liner such as a silicon coated release paper which covers the adhesive layer 3 prior to application to the desired substrate and the latter being a sheet which serves as an aid to application of the transfer article to the substrate, after which it is removed.

Figure 2:
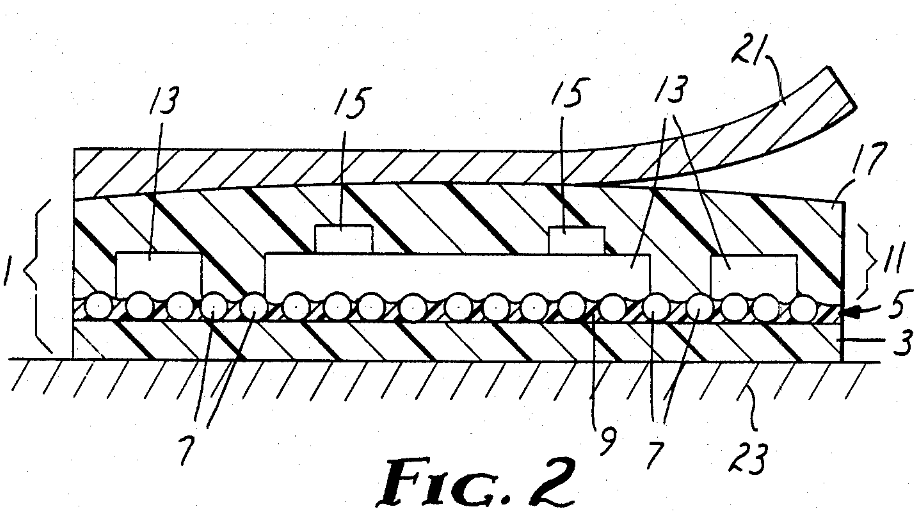
FIG. 2 is an enlarged cross-sectional view of the dry transfer article of FIG. 1 bonded to a substrate.

In FIG. 2, the transfer article of FIG. 1 (with release liner 19 previously removed) is bonded to a substrate 23, and application tape 21 is in the stage of partial removal. While in place, application tape permits handling of the transfer article 1 which otherwise is subject to wrinkling owing to its very thin, flexible construction. If pressure or heat is required to provide the necessary bonding to the substrate, the tape 21 can serve as the contact surface for such forces to prevent damage to the transfer article 1 before it is securely adhered to and supported by the substrate 23.

The transfer article 1 may be manufactured by a variety of conventional techniques, which is one of the advantages of the invention. A typical procedure is to apply the adhesive layer 3 to release liner 19 by a roll coating operation or knotch bar coating. After drying the adhesive to remove solvent or the like, the particles 7 of layer 5 are applied to the exposed surface of the adhesive layer 3 by an electrostatic coating process or by a gravitational technique which preferably provides a substantially uniform, coplanar, monolayer coating of particles. The individual particles are preferably touching adjacent particles, i.e., contiguous. If the preferred but optional matrix substance 9 is to be included in the construction, it may be applied as a slurry or the like with the particles or as a solution to the layer 5 coated with the particles 7 such that the substance 9 flows between adjacent particles 7 to form the adhesive migration inhibiting matrix referred to above. After removing any liquids present as a result of applying particles and/or resin, the first and second inks 13 and 15, respectively, are then applied to layer 5. Ink application can be accomplished by a variety of printing techniques, including silk screening, gravure printing, and off-set printing.

That off-set printing can be employed to provide the graphic design for the transfer article is a significant facet of the present invention. While off-set printing on substrates such as paper and cloth is accomplished without difficulty, substrates such as plastic film present special problems requiring use of special inks, particularly ultraviolet light curable inks. It has been found that the particle-bearing layer of the transfer article, with or without the resin matrix, is amenable to off-set printing using conventional inks.

Following application of the graphic design, which may consist of one or a plurality of inks applied sequentially in forward rather than reverse order, the ink protective layer 17 may be applied, if desired, by conventional coating techniques including gravure or silk-screen printing. This layer 17 should preferably be continuous over the surface of the graphic design and be such as to allow detection, generally visual detection, of the underlying design. The layer 17 is most often a resin transparent to visible light.

The transfer article of the present invention, with or without the optional protective coating covering the ink layer, can be provided with an overall thickness of 40 microns or less if desired. The adhesive layer generally ranges from 5 to 30 microns, and the particle containing layer from 500 angstroms to 20 microns. Individual particles range from 10 angstroms to 20 microns in major dimension. The particles may be provided as a monolayer or multi-layers. The overall thickness of the ink layer depends upon a variety of factors including the number of sub-layers which are present. In general, the overall ink layer ranges in thickness from 0.5 to 30 microns.

A wide variety of adhesives may be employed in the practice of the invention. Room temperature, pressure-sensitive adhesives which do not require any pre-bonding activation are preferred, although heat-sensitive adhesives are also employed. In general, it is desirable that the adhesive be water-proof, heat resistant and weatherable. Pressure-sensitive acrylic resins represent a preferred class of adhesives. The adhesive layer typically ranges from 5 to 15 microns and more generally from 10 to 15 microns in thickness. While the adhesive layer may be patterned or continuous, the latter is generally the case.

The particles employed in the practice of the invention should be of a size and shape to provide an appropriate substrate in terms of uniformity in surface smoothness for the desired graphic design. As a general rule, the finer the resolution demands for the graphic design, the smaller should be the particles and the more compactly placed across the surface of the layer 5. Particle sizes ranging from about 0.1 to about 20 microns, most preferably 0.2 microns to 10 microns, may be utilized. Although size variation is not critical, suitably the major proportion of particles vary in major dimension by no more than about 5 microns or so, preferably about 2 microns, and most preferably less than 1 micron. The particle may be regular or irregular in shape, although the former is preferred. Spherical or flat (scale-like) shaped particles of substantially uniform size are most desired, especially when the particle containing layer also includes the matrixing substance depicted as numeral 9 in the drawings. Suitable materials of which the particles may be made are a variety of synthetic and naturally occurring substances, including glass, silica, volcanic ash, mica, plastics and metals and combinations thereof.

The matrixing substance may be any material which is compatible with the particles, adhesive, and ink employed in the construction of the transfer article. The material is generally a resin, typically a multi-purpose urethane resin or an acrylic resin.

The matrix material (which generally ranges from 0 to 50% by weight of the combined weight of matrixing material and particles) may be applied together with the particles as a slurry or separately from the particles. The matrix material should be sufficient in quantity to fill any voids between adjacent particles to provide a barrier to migration of adhesive through the layer into the ink-containing layer. In those cases when matrixing material is not present, preferably at least 50% of the surface area of layer 5 is covered by particles, more preferably 80% and most preferably as much as 95% up to 100%, although the latter limit is difficult to achieve in practice. When matrixing material is present in the particle containing layer, preferably at least 50% of the surface area of layer 5 should be occupied by particles 7, more preferably 75%, and most preferably 90% or more.

The liner 19 and application tape 21 may be any contional sheet-like material which will temporarily adhere to the surface with which it is associated and be removable therefrom completely and without damage to the transfer article itself. In the case of the release liner 19 associated with the adhesive layer, a silicon coated release liner is suitable. The tape 21 is typically a film or paper coated with a pressure-sensitive adhesive which will provide a non-aggressive bond to the surface of the article it covers.

The invention will be further described by the following examples in which all parts and percentages are by weight unless otherwise stated.

EXAMPLE 1

An adhesive is prepared by adding 0.5 parts by weight of a cross-linking agent ("Coronate L", tradename for a product of Nippon Polyurethane K.K.) to a copolymer consisting of 100 parts by weight of butyl acrylate and 5 parts by weight of acrylic acid. The adhesive is roll-coated on silicon coated release paper and dried at 100° C. for 3 minutes (dry thickness 10 microns). Fine particles of sodium glass having an average particle diameter of 1 micron are uniformly coated on the adhesive layer by an electrostatic coating process. The coverage is essentially a monolayer of contiguous particles (approximately 100% surface coverage).

An acrylic resin ("Paraloid C-10LV", tradename for a product of Rohm and Haas Co.) is diluted about 20 times with toluene and the solution is thinly coated (about 2 g/$m^2$ dry weight) on the fine particle layer by a curtain coating process and dried at 120° C. for 3 minutes. The acrylic resin fills the interstitial spaces between the sodium glass.

A graphic pattern is superposition-printed in three colors on the particle containing layer by silk-screen printing using a vinyl chloride type ink (Natsudar GV Series Ink) and dried at 65° C. for 30 minutes. Defects such as creases and cracks are absent from the printed surface. After printing, the transfer article is 15 micron thick.

The unnecessary portions of the transfer article are removed by a semi-punch operation. Thereafter, protective paper (application tape) is bonded to the surface bearing the graphic pattern and a full punch operation is then done to finish the transfer article.

To apply the article, the release liner is removed from the transfer article and the article is sufficiently press-bonded by a squeegee applied to the protective paper. The substrate is a melamine-alkyl coating. The protective paper is peeled away, leaving a graphic design marked surface which has the feel and appearance of paint.

EXAMPLE 2

Acrylic pressure-sensitive adhesive combined with 0.25 parts by weight of a cross-linking agent is knotch-bar coated on a silicon release paper liner and dried at 80° C. for 2 minutes so that the thickness of the adhesive is 15μ dry. 80 weight percent of fine particles of $TiO_2$ powder (R-936 TIPAQUE, tradename of Ishihara Sangyo Co.) and 20% by weight of solid polyurethane resin (NE 310, tradename of Dainichiseika Kogyo Co.) is diluted to 20% solid contents by weight using 1 part of toluene and 4 parts of isopropyl alcohol as solvent for the resin. The slurry is knotch-bar coated directly on the adhesive layer and dried at 100° C. for 3 minutes to provide a 3μ thick layer.

This particle containing layer is silk-screen printed with a vinyl resin ink (SCOTCHCAL 3900, tradename of 3M) and dried at 65° C. for 30 minutes. Defects such as wrinkles and cracks are not observed on the printed surface. This printed material is kiss-cut and weeded by conventional means. Thereafter, the application tape is applied and the resultant structure die-cut to finish the transfer article.

The release liner is removed from the transfer article and the article applied to an acrylic painted panel by a squeegee. After the application tape is removed, a protective resin (Hi-Urethane #5000 clear available from Nihon-Ushi Co.) is spray-coated on the surface of the transfer article and baked at 105° C. for 30 minutes.

EXAMPLE 3

A heat-sensitive adhesive is coated on the polyester coated release liner by a round-bar and dried at 40° C. for 2 minutes to provide a 10 micron dry adhesive coating. Fine particles of silica (10 to 20 mμ) (SCAP-3102, tradename of Shoku-Bai Kasei Co.) are uniformly coated on the adhesive layer by an electrostatic coating process (surface coverage 95%). The product is then heated at 80° C. for 2 minutes.

The particle-containing layer is then silk-screen printed with the ink of Example 2 and dried at 65° C. for 30 minutes. The ink surface is then silk-screen printed with an ultraviolet light curable resin. After curing, this clear transfer article is ready for use in the same manner as Example 2 except that bonding to the substrate is achieved by heating the adhesive to a temperature of 120° C. for 2 to 3 minutes.

EXAMPLE 4

A pressure-sensitive acrylic adhesive is knotch-bar coated on a silicon release paper liner and dried at 80° C. for 2 minutes to provide an adhesive layer of 20μ. 70 weight percent of fine particle bronze powder (HRS-370, tradename of Fukuda Metal Co.) (15μ) and 30 weight percent of acrylic resin (solid) (ARON A-102, tradename of Toa-Gosei Kagaku Co.) is diluted to 15% solid contents by weight with water. The solution is coated directly on the adhesive layer using an airknife coater and dried at 90° C. for 3 minutes. The particle containing layer is screen printed with an ink (SCOTCHCAL 3900, tradename of 3M) at 65° C. for 30 minutes. The ink layer is then screen-coated with a clear resin. The resulting transfer article is free of wrinkles and cracks.

EXAMPLE 5

A pressure-sensitive acrylic adhesive is knotch-bar coated on a silicon release paper liner and dried at 80° C. for 2 minutes (coating thickness 15μ). $CaCO_3$ (0.5μ) particles are uniformly coated on the adhesive layer by an electrostatic coating process. The particle surface is screen-printed with ink (SCOTCHCAL 3900, tradename of 3M) and dried at 65° C. for 30 minutes. Defects such as wrinkles and cracks are not observed on the printed surface. The transfer article is kiss-cut and weeded according to conventional techniques. Thereafter, the application tape is laminated to the article and die cut (full punch operation) to provide the finished article. The release liner is removed from the article and the article press-bonded to the substrate (melamine-/alkyd coating) with a hand-held squeegee to provide a low profile, crack and wrinkle-free marking.

EXAMPLE 6

A pressure-sensitive adhesive with 0.25 parts by weight of a cross-linking agent is knotch bar coated on a silicon release liner and dried at 80° C. for 2 minutes (thickness 15μ). Polyurethane resin (NE 310, tradename of Dainichiseika Kosyo Co.) is diluted to 20% solid contents by weight using 1 part of toluene and 4 parts of isopropyl alcohol. The mixture is then knotch-bar coated directly on the adhesive layer and dried at 100° C. for 3 minutes (3μ thickness). The polyurethane resin layer is screen-printed with an ink (SCOTCHCAL 3900, tradename of 3M) and the ink dried at 65° C. for 30 minutes. The surface of the article, which did not include the particles of the present invention, was observed to be defective due to wrinkles.

The transfer article of the present invention enjoys the advantages of both self-supporting film containing and film-free transfer articles. Wrinkling and cracking are reduced substantially. Warping due to the presence of the base film is eliminated. The transfer article of the present invention can be constructed utilizing conventional, efficient, high speed coating techniques and materials which are economical, durable, and convenient. The aesthetics of low-profile, paint-like appearance are achieved. The transfer article with the release liners in place can be formed into a roll for shipping, storage, and dispensing. Dependence upon latent, activatable adhesives is eliminated.

I claim:

1. A low profile flexible transfer article comprising:

(a) a first layer comprising an adhesive capable of bonding said article to a given substrate.

(b) a second layer securably adhered to said first layer, said second layer comprising a coating of discrete, inert particles, said particles being sufficiently proximately placed relative to one another to present an ink-printable surface, and, optionally, a matrixing agent which fills the voids between said adjacent particles without covering said particles, and (c) a third layer adhered to said ink-printable surface of said second layer, said third layer comprising at least one stratum of ink defining a predetermined pattern, said article being free of a permanent self-supporting base film.

2. The article of claim 1 wherein said adhesive is pressure-sensitive.

3. The article of claim 1 further comprising a first release member releasably bonded to said first layer and a second release member releasably bonded to said third layer, whereby said article is storable in roll form.

4. The article of claim 1 wherein said matrixing agent is flexible and spans adjacent particles whereby said second layer is substantially void-free such that migration of adhesive from said first layer to said third layer is prevented.

5. The article of claim 4 wherein said adhesive is pressure sensitive.

6. The article of claim 1 wherein the overall thickness of said article is less than about 40 microns.

7. The article of claim 1 further comprising a fourth layer providing a continuous, protective coating for said third layer, said fourth layer further allowing said graphic design to be detectable through said fourth layer.

8. The article of claim 1 wherein said particles are of a substantially uniform shape and size.

* * * * *